United States Patent [19]

Hart

[11] 4,174,850
[45] Nov. 20, 1979

[54] FENDER FLARE CLIP APPARATUS

[76] Inventor: Richard K. Hart, 11422 Yearling Cir., Cerritos, Calif. 90701

[21] Appl. No.: 910,473

[22] Filed: May 30, 1978

[51] Int. Cl.² ............................................. B62D 25/16
[52] U.S. Cl. ................................ 280/153 R; 24/243 B
[58] Field of Search ........................ 280/152 R, 153 R;
24/243 B, 81 PE, 269/249, 321 S;
D8/73, 366, 371, 394, 72; 403/205, 338, 405,
DIG. 9

[56] References Cited

U.S. PATENT DOCUMENTS

| D. 242,113 | 11/1976 | Mooney | D8/394 |
| 2,243,468 | 5/1941 | Johnson | 24/243 B |
| 4,030,773 | 6/1977 | Meixner | 280/153 R |

FOREIGN PATENT DOCUMENTS

| 627596 | 1/1927 | France | 280/152 R |
| 651484 | 3/1928 | France | 280/152 R |
| 700936 | 12/1953 | United Kingdom | 24/243 B |

Primary Examiner—Robert R. Song
Attorney, Agent, or Firm—Fulwider, Patton, Rieber, Lee & Utecht

[57] ABSTRACT

A clip apparatus for releasably securing a fender flare onto a vehicle fender. The apparatus utilizes a bolt which is tightened so as to engage the flare and the fender and rigidly retain the flare on the fender.

4 Claims, 5 Drawing Figures

FENDER FLARE CLIP APPARATUS

BACKGROUND OF THE INVENTION

1. Field of the Invention

The present invention relates to automotive vehicles provided with fender flares. Such flares extend around the peripheral opening of the fender so as to provide an outwardly extending continuation thereof.

2. Description of the Prior Art

Fender flares have heretofor been affixed to a fender by drilling holes through the flare and the fender and thereafter inserting bolt and nut combinations, rivets or screws through such holes. This arrangement has many disadvantages. The limited space available makes application of the flares to the fender and removal therefrom extremely difficult. It is additionally tedious to match the holes in the flare and the fender. The rigid connection afforded by the bolt and nut combinations, rivets or screws can result in damage to the flare in the event of even a minor collision. The provision of the fastening holes can lead to corrosion of the fenders, particularly where the automotive vehicle operates on salt-treated roads.

SUMMARY OF THE INVENTION

The flare clip apparatus of the present invention utilizes a flexible generally truncated triangle-shaped clip. One leg is provided with a mounting bolt that is tightened by means of a screwdriver or wrench to releasably clamp the flare to the peripheral portion of the fender. It is a primary object of the present invention to provide flare clip apparatus which permits the flares to be installed and removed from a fender in a minimum amount of time and with a minimum amount of labor.

It is another object of the present invention to provide flare clip apparatus of the aforedescribed nature, which permits the flare to flex upon accidental engagement with a rigid object, thereby preventing costly flare damage.

Yet, another object of the present invention is to provide flare clip apparatus of the aforedescribed nature which is simple of construction, economical of manufacture and which will provide a long and trouble-free service life.

Other objects and advantages of the present invention will become apparent from the following detailed description.

DESCRIPTION OF THE PREFERRED EMBODIMENTS

Figure 1:
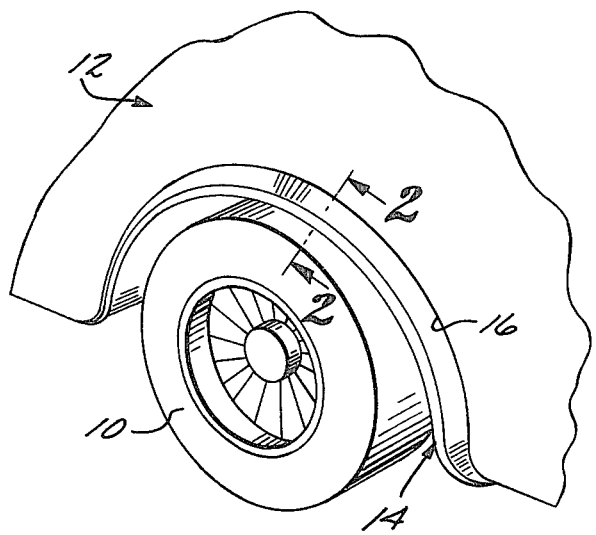
FIG. 1 is a broken perspective view, showing a fender flare affixed to a vehicle fender by a preferred form of clip apparatus embodying the present invention.

Referring to the drawings, there is shown the front fender portion of an automotive vehicle having a wheel 10 housed within a fender, generally designated 12, provided with a conventional fender flare, generally designated 14. Fender flare 14 is of the type generally formed of fiberglass or synthetic plastic and extends around the peripheral portion 16 of fender 12 so as to provide an outward extension thereof. It is to be understood that flare 14 is removable relative to fender 12 so as to permit off-road operation of the vehicle, or to permit temporary replacement of normally-used wheels, tires and rims.

More particularly, fender 12 includes a peripheral flange 20. Flare 14 is of integral fiberglass construction and includes a lip 22 that underlines fender flange 20. Flare 14 also includes a generally vertically extending web 24 that overlies the exterior surface of fender 12 adjacent fender flange 22. The end of web 24 opposite lip 22 integrally merges into the skirt 30 of the fender flare.

Figure 2:
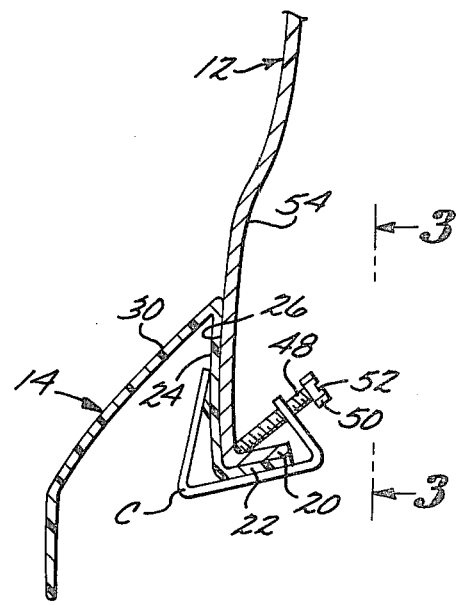
FIG. 2 is a vertical sectional view taken in enlarged scale along line 2—2 of FIG. 1.
Figure 3:
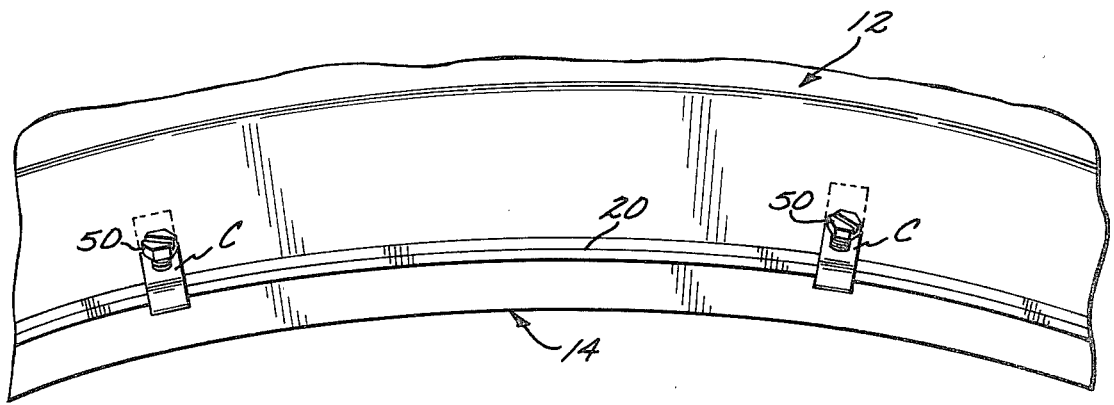
FIG. 3 is a broken side elevational view taken along line 3—3 of FIG. 2.
Figure 4:
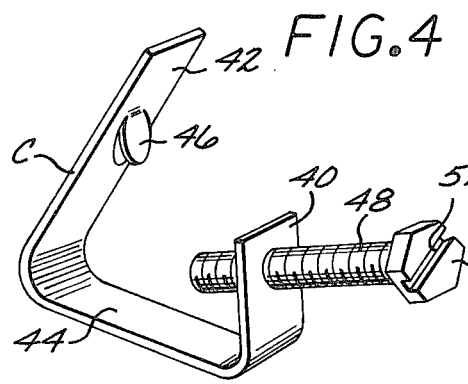
FIG. 4 is a perspective view in further enlarged scale of the preferred form of flare apparatus embodying the present invention.

The preferred form of flare clip apparatus embodying the invention is shown in FIGS. 1-4. Referring thereto, such apparatus includes a flexible clip C, preferably of steel construction, which is of generally truncated triangle-shaped configuration, having an inner leg 40, which is shorter than outer leg 42. The lower ends of legs 40 and 42 merge into a horizontal center leg 44. An inwardly extending tooth or prong 46 is formed adjacent the free end of the outer clip leg 42, preferably by punching a portion of the leg 42 inwardly. The inner leg 40 threadably carries a mounting bolt 48 of conventional construction, having a head 50 provided with a slot 52 to receive a screwdriver or the like (not shown). As indicated in FIG. 2, the non-headed end of mounting bolt 48 engages the juncture of fender lip 20 and adjacent the edge of fender body portion 54.

To install the flare 14 on fender 12, the flare is retained in the proper position within fender periphery 16. Thereafter, a plurality of clips C (generally four) are positioned along the length of the flare. The mounting bolts 48 are then tightened by means of a screw driver or wrench until the tooth 46 tends to bite into the material of the flare 14. The legs 40 and 42 can undergo flexing so as to insure a tight, rattle-proof engagement between the flare 14 and fender 12. Should it be desired to temporarily remove the fender flare 14, the mounting bolts 48 may be easily unscrewed and clips C disengaged from their flare supporting position. It will be clear that installation of the flares and their removal from fender 12 can be accomplished quickly and easily. Moreover, since the clips C are flexible, the flare 14 will securely remain in place on fender 12, since such tooth 46 will tend to bite into the fiberglass flare. Moreover, the tooth's inwardly facing surface provides extra anchoring area, as compared with a clip not provided with such a tooth.

Figure 5:
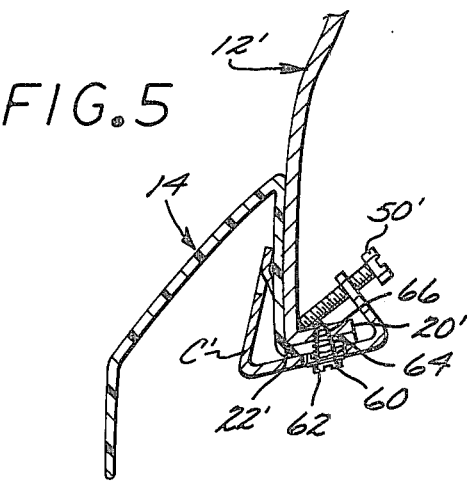
FIG. 5 is a vertical sectional view, similar to FIG. 2, but showing a second form of flare clip apparatus embodying the present invention.

Referring now to FIG. 5, there is shown a second form of clip apparatus C' embodying the present invention. Elements of the second form of clip apparatus, similar to those shown in FIGS. 1-4, bear primed reference numerals in FIG. 5. Clip C' is identical to the aforedescribed clip C, with the exception that the mid portion of center leg 44 is formed with a elongated slot 60 that receives a screw 62. Screw 62 is inserted through aligned threaded openings 64 and 66, that extend through flare lip 22' and fender flange 20'. Tightening of screw 62 within threaded openings 64 and 66 provides theft protection for the flare 14'.

Various modifications and changes may be made with respect to the aforegoing detailed description, without departing from the spirit of the present invention.

I claim:

1. In combination with a flare having a lip that underlies a peripheral flange of a vehicle fender, and a vertically extending web that overlies the exterior surface of said fender adjacent said peripheral flange,
   - a flexible clip of generally truncated triangle shape having a center leg that abuts the exterior of the lip of said flare, the opposite ends of said center leg integrally merging into inner and outer legs which extend away from the ends of said center leg and taper towards one another,
   - a tooth formed adjacent the free end of said outer leg, and
   - a bolt threadedly carried by said inner leg so as to be rotated into tight frictional engagement with the inside of said fender adjacent the lip thereof to thereby releasably lock said clip and flare onto said fender, with said tooth in biting engagement with the web of said flare.

2. Clip apparatus as set forth in claim 1, wherein said center leg is formed with a slot that receives a screw, and said fender flange and flare lip are formed with aligned threaded openings that receive said screw.

3. Clip apparatus as set forth in claim 1, wherein said inner leg is shorter than said outer leg.

4. Clip apparatus as set forth in claim 2, wherein said inner leg is shorter than said outer leg.

* * * * *